(12) United States Patent
Mundt et al.

(10) Patent No.: US 8,313,385 B2
(45) Date of Patent: Nov. 20, 2012

(54) TORSIONAL VIBRATION DAMPER ARRANGEMENT

(75) Inventors: Stefan Mundt, Würzburg (DE); Thomas Krüger, Berlin (DE); Christian Wickel, Wartmannsroth (DE); Erwin Wack, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 98 days.

(21) Appl. No.: 12/914,498

(22) Filed: Oct. 28, 2010

(65) Prior Publication Data

US 2012/0064983 A1   Mar. 15, 2012

(30) Foreign Application Priority Data

Sep. 10, 2010   (DE) .................... 20 2010 012 465 U

(51) Int. Cl.
*F16F 15/123* (2006.01)
(52) U.S. Cl. .................................... 464/68.8; 192/3.29

(58) Field of Classification Search ................ 464/67.1, 464/68.1, 68.7, 68.8, 68.9, 68.92; 192/30 V, 192/55.2–55.7, 70.17, 200–214.1
See application file for complete search history.

(56) References Cited

U.S. PATENT DOCUMENTS

| | | | | |
|---|---|---|---|---|
| 5,984,065 | A | * | 11/1999 | Teramae et al. ............... 192/205 |
| 6,106,400 | A | * | 8/2000 | Mizukami .................. 464/68.92 |
| 6,131,487 | A | * | 10/2000 | Jackel et al. ............... 464/68.92 |
| 6,227,976 | B1 | * | 5/2001 | Rohs et al. ................... 464/68.9 |
| 2009/0247307 | A1 | * | 10/2009 | Ishikawa et al. ............. 464/68.8 |

FOREIGN PATENT DOCUMENTS

DE   10 2006 052 853   5/2008
* cited by examiner

*Primary Examiner* — Gregory Binda
*Assistant Examiner* — Josh Skroupa
(74) *Attorney, Agent, or Firm* — Cozen O'Connor

(57) ABSTRACT

A torsional vibration damper arrangement such that an excessive radially outward flexing of spring units is effectively prevented while torsional vibrations occurring at low torques are nevertheless sensitively damped and the corresponding spring unit is protected against overloading at the same time.

6 Claims, 4 Drawing Sheets

TORSIONAL VIBRATION DAMPER ARRANGEMENT

BACKGROUND OF THE INVENTION

1. Field of the Invention

The present invention is directed to a torsional vibration damper arrangement having a driving transmission device and a driven transmission device rotatable around an axis of rotation counter to the action of a damping arrangement with respect to the driving transmission device. The damping arrangement includes at least one damper unit with a plurality of spring units arranged successively in circumferential direction. The driving transmission device and the driven transmission device have circumferential supporting areas for the at least one damper unit, the latter being supported thereon by circumferential ends, and a radial supporting arrangement for radial support of the damper unit in an intermediate supporting area between the circumferential ends thereof. The radial supporting arrangement includes at least one annular radial supporting member with radial supporting units, at least some of which are intended to receive spring cups to enter into an operative connection with the respective associated intermediate supporting areas of the damper unit by these spring cups, a circumferential projection which is provided at the respective spring cup and which penetrates into the associated spring unit is enclosed by the respective intermediate supporting area of this spring unit. The at least one annular radial supporting member is rotatable around the axis of rotation with respect to the driving transmission device and the driven transmission device.

2. Description of the Related Art

A torsional vibration damper arrangement of the type mentioned above is known, from DE 10 2006 052 853 A1 in which two damper units are radially offset with respect to one another. The spring units of the radially inner damper unit are received in spring windows and are relatively short in circumferential direction so that there is little evidence of any negative influence of centrifugal force. In contrast, a large spring volume is introduced by the spring units of the radially outer damper unit so that there is a risk that these springs will be displaced radially outward under the influence of the centrifugal force at least along some of their extension length on the circumference side. In order to mitigate such a process, the individual spring units are supported not only in circumferential supporting areas of the driving transmission device and driven transmission device but also in circumferential direction therebetween, namely, by radial supporting units that engage at intermediate supporting areas of the spring units. For this reason, DE 10 2006 052 853 A1 shows a construction for a torsional vibration damper arrangement in which annular radial supporting members extend radially inside the spring units and reach into the intermediate supporting areas of the spring units toward the radial outer side with radial supporting units. A construction of this kind is shown, for example, in FIG. 21 or FIG. 22. In this construction, recesses are provided at the respective radial supporting unit and projections of the spring cups engage in these recesses. Further, these spring cups have circumferential projections which penetrate into the associated spring unit to a depth of a maximum of one turn.

While the spring units of the radially outer damper unit in the known torsional vibration damper arrangement may be supported against the effect of centrifugal force with minimal friction, the support is moderate when the spring units are long in the circumferential direction, so that there is inevitably an appreciable bending of the spring unit radially outward in spite of the radial supporting arrangement in the intermediate supporting area. This fundamental problem may lead to the problem of an undesirably severe deflection particularly in spring units with low torque transmission capacity. However, it is precisely spring units of this kind which allow excellent decoupling for torsional vibrations under small loads, i.e., when low torque is applied, and which further necessitate a special arrangement for limiting rotational angles to prevent the turns of this spring unit from making contact when higher torques are applied. While the arrangement for limiting rotational angles in the known torsional vibration damper arrangement may protect the radially outer damper unit in its entirety, it does not protect an individual spring unit of this damper unit that is designed for low torque.

SUMMARY OF THE INVENTION

An object of the invention is a torsional vibration damper arrangement such that an excessive radially outward flexing of spring units is effectively prevented while torsional vibrations occurring at low torques are nevertheless sensitively damped and the corresponding spring unit is simultaneously protected against overloading.

According to one embodiment of the invention, a torsional vibration damper arrangement comprising a driving transmission device and a driven transmission device rotatable around an axis of rotation counter to the action of a damping arrangement with respect to the driving transmission device, wherein the damping arrangement includes at least one damper unit with a plurality of spring units arranged successively in circumferential direction, and the driving transmission device and the driven transmission device have circumferential supporting areas for the at least one damper unit, the latter being supported thereon by circumferential ends, and further comprising a radial supporting arrangement for radial support of the damper unit in an intermediate supporting area between the circumferential ends thereof, wherein the radial supporting arrangement includes at least one annular radial supporting member with radial supporting units, at least some of which are intended to receive spring cups in order to enter into an operative connection with the respective associated intermediate supporting areas of the damper unit by these spring cups in that a circumferential projection which is provided at the respective spring cup and which penetrates into the associated spring unit is enclosed by the respective intermediate supporting area of this spring unit, and wherein the at least one annular radial supporting member is rotatable around the axis of rotation with respect to the driving transmission device and the driven transmission device.

Further, the radial supporting units have circumferential extensions, and the spring cups are constructed as hollow bodies which surround the respective circumferential extensions so as to be supported at the latter at least radially, and circumferential extensions are provided which cooperate with a stop of the associated circumferential supporting area as a rotational angle limit between the radial supporting arrangement and this circumferential supporting area.

This construction with circumferential extensions not only makes it possible for the radial supporting units of the radial supporting arrangement to carry out a radial support of the spring cups, but also makes it possible to limit the rotational angle for the corresponding spring unit. In order to perform the latter function, the respective circumferential extension is oriented toward the stop of the associated circumferential supporting area so that the circumferential extension and the stop approach one another when a relative movement between the radial supporting arrangement and the corresponding transmission device, e.g., the driving transmission device or driven transmission device, causes a compression of the spring unit. As soon as there is contact between the circumferential extension and the stop, further compression of the spring unit is prevented and, therefore, the individual turns of the spring unit are prevented from coming into contact. This considerably reduces the risk of breakage of these turns due to internal stresses.

Further, by engaging in the respective spring unit, the circumferential extensions at the radial supporting units counter a centrifugal force-dependent flexing so that it is even possible to use spring units which are designed for particularly low torques and which are able to build up their own deformation resistance against the effect of centrifugal force only to a limited degree. This same advantage is also offered by the spring cups which, owing to their radial support at the circumferential extensions, secure the respective spring unit radially particularly when the circumferential projection of the respective spring cup penetrates deeply into the corresponding spring unit on the one hand and the spring unit securely encloses the respective spring cup by its supporting area on the other hand. Therefore, the spring cups penetrate deeper into the corresponding spring unit than the extension width of only the first turn and therefore secure the respective supporting area of the spring unit in radial direction against centrifugal force.

Like the circumferential extensions at the radial supporting units, the stop of the circumferential supporting area in the form of a circumferential shoulder can also engage in the respective spring unit and be enclosed by a spring cup supported radially at the circumferential shoulder securely enclosed in turn by the circumferential end of the respective spring unit. The radial support of the spring unit against centrifugal force is further improved by cooperation with the circumferential extension at the associated radial supporting unit.

Circumferential extension at a radial supporting unit combined with a circumferential shoulder acting as a stop at the associated circumferential supporting area is advantageous particularly in spring units which do not extend very far in circumferential direction. A spring unit of this kind, hereinafter designated as first spring unit, is preferably adjusted in such a way that it provides for an efficient decoupling at low torques. In contrast to the first spring unit, the additional spring unit is provided for absorbing higher torques and, when appropriately designed in circumferential direction, provides a large spring volume for excellent decoupling of these torques. The combination of the two spring units is particularly advantageous for a damper unit of a damping arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described more fully with reference to the accompanying drawings in the drawings.

DETAILED DESCRIPTION OF THE PRESENTLY PREFERRED EMBODIMENTS

Figure 1:
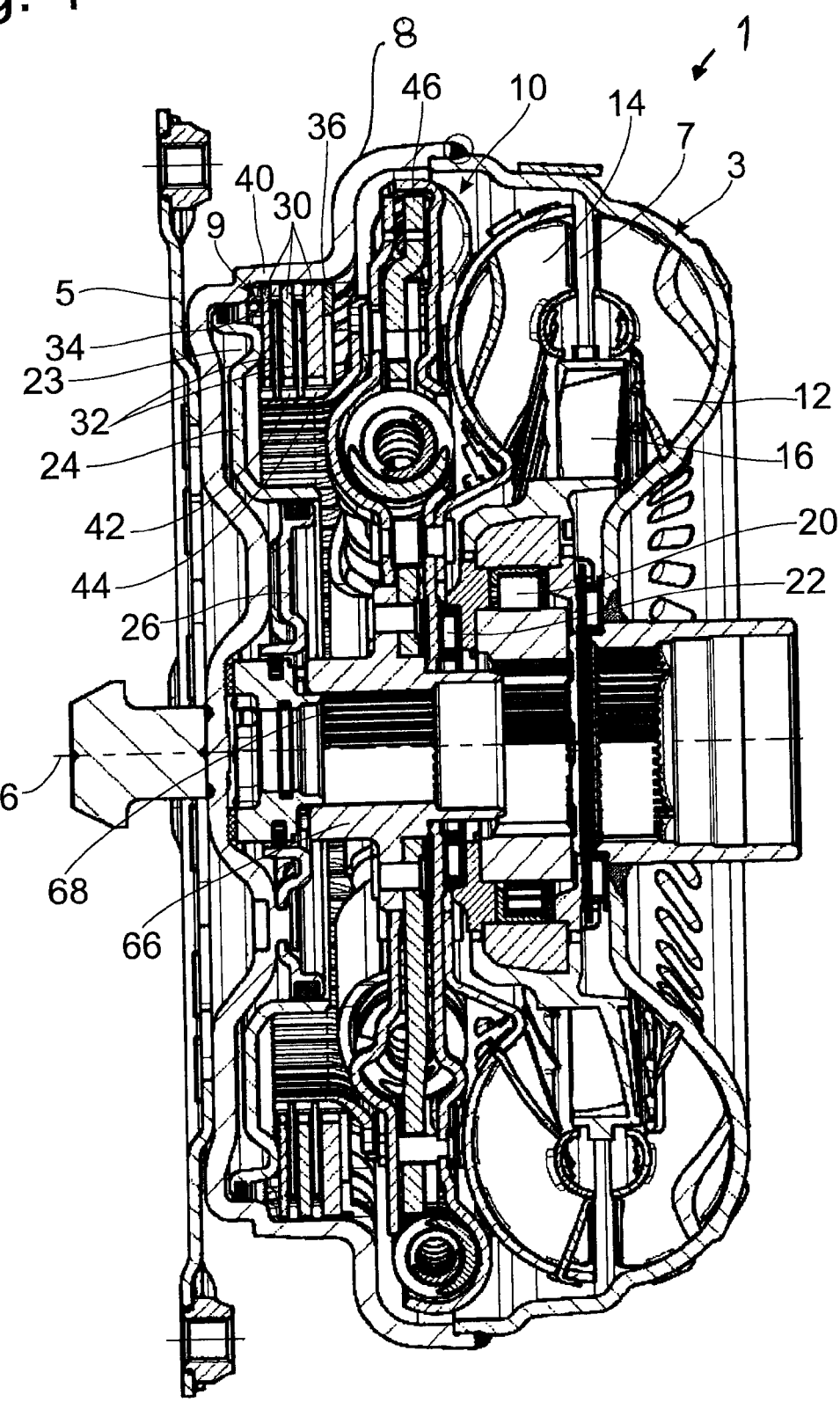
FIG. 1 is a view of a hydrodynamic torque converter with a torsional vibration damper arrangement according to one embodiment of the invention.

FIG. 1 shows a coupling device 1 in the form of a hydrodynamic torque converter having an axis of rotation 6. The coupling device 1 has a housing 3 which is connected in a conventional manner by a flex plate 5 to a crankshaft of an internal combustion engine, not shown. The housing 3 encloses a hydrodynamic circuit 7 which includes a pump 12, a turbine 14, and a stator 16. The stator 16 is supported by a freewheel 20 which is supported by a bearing 22 at a torsional vibration damper arrangement 10 which will be discussed at greater length in the following.

The torsional vibration damper arrangement 10 cooperates with a lockup clutch 9 having a piston 24, radially outer clutch elements 30, radially inner clutch elements 32, and an axial support 36. The piston 24 is received in an axially displaceable manner on a piston guide 26 fastened to the drive-side housing cover 8. The radially outer clutch elements 30 are connected to the housing 3 by a first toothing 34 so as to be fixed with respect to rotation but axially displaceable relative to the housing 3, which accordingly acts as an outer clutch element carrier 40, while the radially inner clutch elements 32 are connected to a ring gear 43 by a second toothing 42 so as to be fixed with respect to rotation but axially displaceable relative to the ring gear 43 which serves as an inner clutch element carrier 44. The axial support 36 is preferably fastened to the housing 3 axially adjacent to the clutch elements 30, 32.

The lockup clutch 9 is engaged when a pressure space 23 provided between the housing cover 8 and piston 24 is acted upon by a pressure above that of the hydrodynamic circuit 7, and the piston 24 is accordingly pressed against the clutch elements 30, 32 and, therefore, against the axial support 36. The lockup clutch 9 is disengaged when the pressure ratios between the pressure space 23 and the hydrodynamic circuit 7 are reversed, and the piston 24 is displaced in direction of the housing cover 8 while releasing the clutch elements 30, 32.

The torsional vibration damper arrangement 10 is described in the following with reference to FIGS. 2 to 4. The torsional vibration damper arrangement 10 has a damping arrangement 54 with a radially outer damping unit 52 and a radially inner damping unit 56. The radially outer damping unit 52 is provided with three spring assemblies 74 along the circumference. Only one of these spring assemblies 74 will be considered in the following description.

The inner clutch element carrier 44 is connected to a radially outer hub disk 46 so as to be fixed with respect to rotation relative to it by a connection, not shown, and together with the radially outer hub disk 46 forms a driving transmission device 50 of the torsional vibration damper arrangement 10. (FIG. 1.) A drive-side control element 81 acts upon a first spring unit 76 (FIG. 2) adjacent to it in circumferential direction is provided at the radially outer hub disk 46. This spring unit 76 is supported at the other end at a radial supporting unit 98 provided at an annular radial supporting member 96 and, together with the latter, acts as a radial supporting arrangement 92. The radial supporting unit 98 serves to act upon another, second, spring unit 77 which has a first spring 78 and a second spring 79 received inside the latter. The second spring unit 77 is supported at a driven-side control element 86 which can be seen in FIGS. 2 and 4. The two spring units 76 and 77 are part of the radially outer damper unit 52. The drive-side control element 81, which serves as a first circumferential supporting area 80 of the damper unit 52, acts on a first circumferential end 112 of the damper unit 52, while the driven-side control element 86 which serves as second circumferential supporting area 84 acts on a second circumferential end 114 of the damper unit 52. Finally, the radial supporting member 96 acts on an intermediate supporting area 82 of the damper unit 52.

Figure 2:
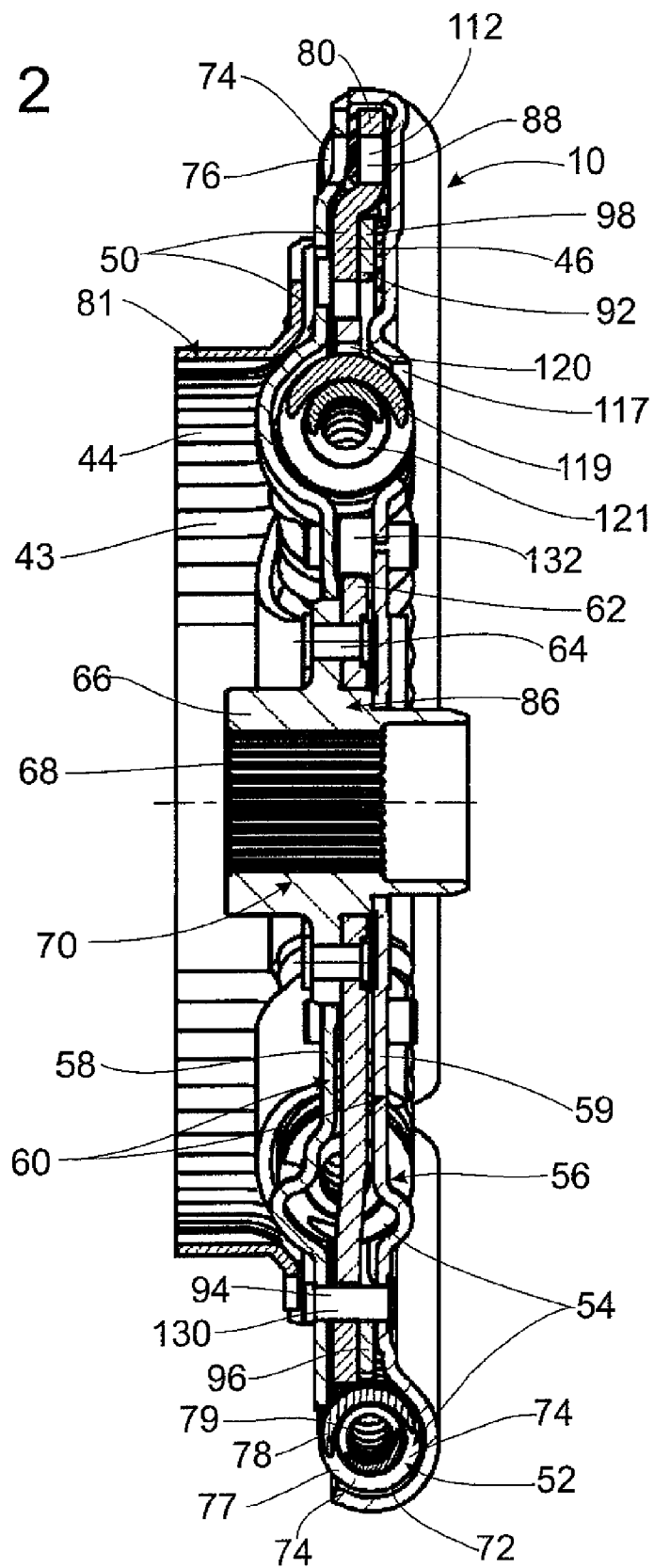
FIG. 2 is a detail of the torsional vibration damper arrangement.

The driven-side control elements 86 of the spring assemblies 74 are provided at least at one of two cover plates 58, 59 as is shown in FIG. 2. These cover plates 58, 59 define an installation space located axially therebetween in which the radially outer hub disk 46 and the radial supporting arrangement 92 are arranged adjacent to one another and—at a distance from the spring units 76, 77—form a receiving channel 72 for the latter on the radially outer side. First spring windows 117 are formed radially inside the spring assemblies 74 in one of the cover plates 58, 59, namely, in cover plate 59, while second spring windows 120 are located in a radially inner hub disk 62. The spring windows 117, 120 serve to receive springs 119, 121 of radially inner spring units 118, each of which has circumferential ends 122. (FIG. 3) Together, these radially inner spring units 118 form the radially inner damper unit 56. Each spring window 117, 120 serves to receive springs 119, 121 of radially inner spring units 118, each of which has circumferential ends 122, 124. Together, these radially inner spring units 118 form the radially inner damper unit 56. The radially inner spring units 118 are controlled by the circumference-side edges of the spring window 117 or 120.

The radially inner hub disk 62 is fastened to a hub 66 by riveting 64. The hub 66 has an inner toothing 68 by which a rotational connection is produced with a driven member, not shown, such as a transmission input shaft. As shown in FIG. 2, intermediate transmission device 60 and driven transmission device 70 are arranged about hub 66.

Figure 3:
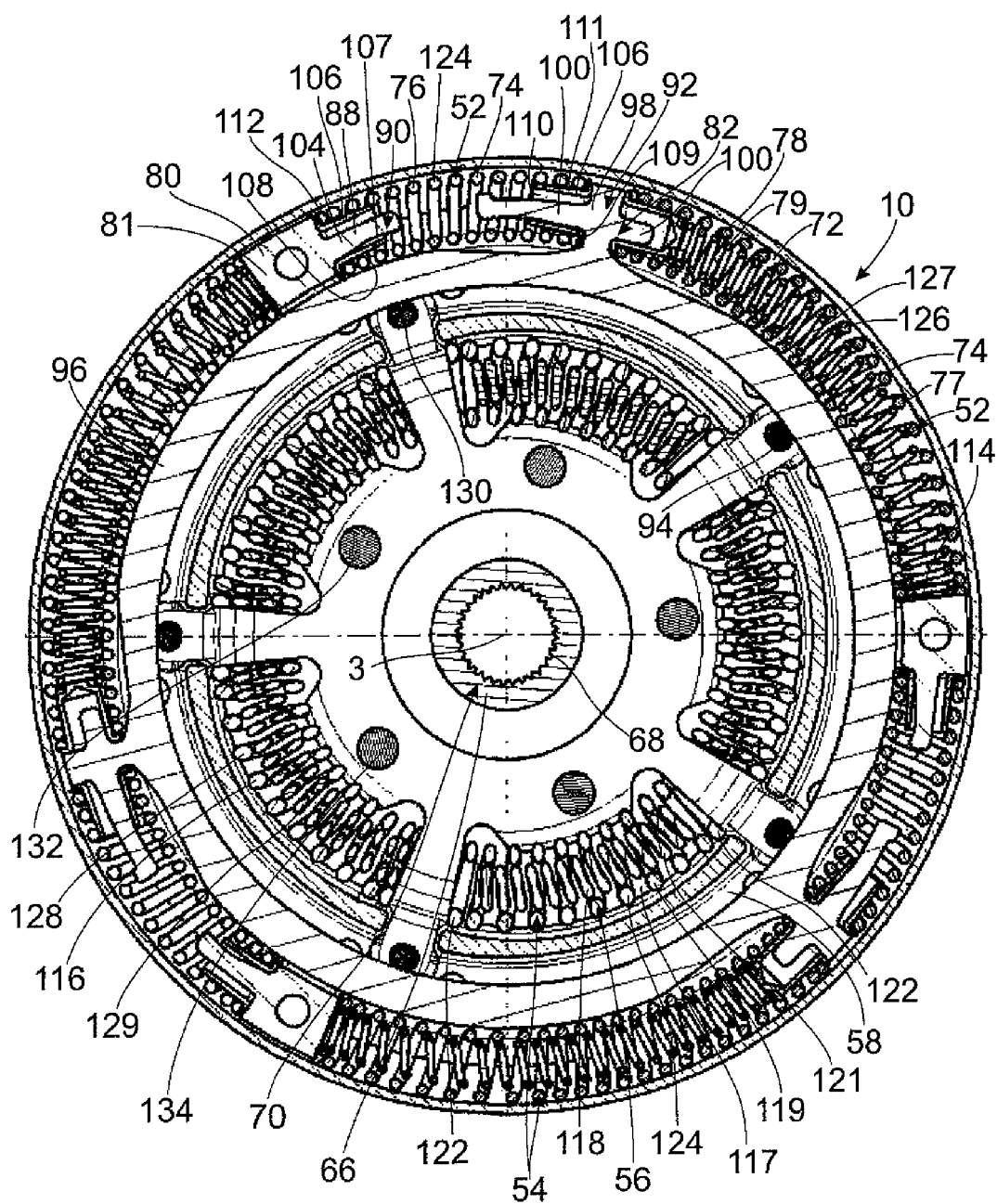
FIG. 3 is a top view of the torsional vibration damper arrangement shown in FIG. 2 in the viewing direction of the axis of rotation with no load acting upon the radially outer damper unit of a damper arrangement.
Figure 4:
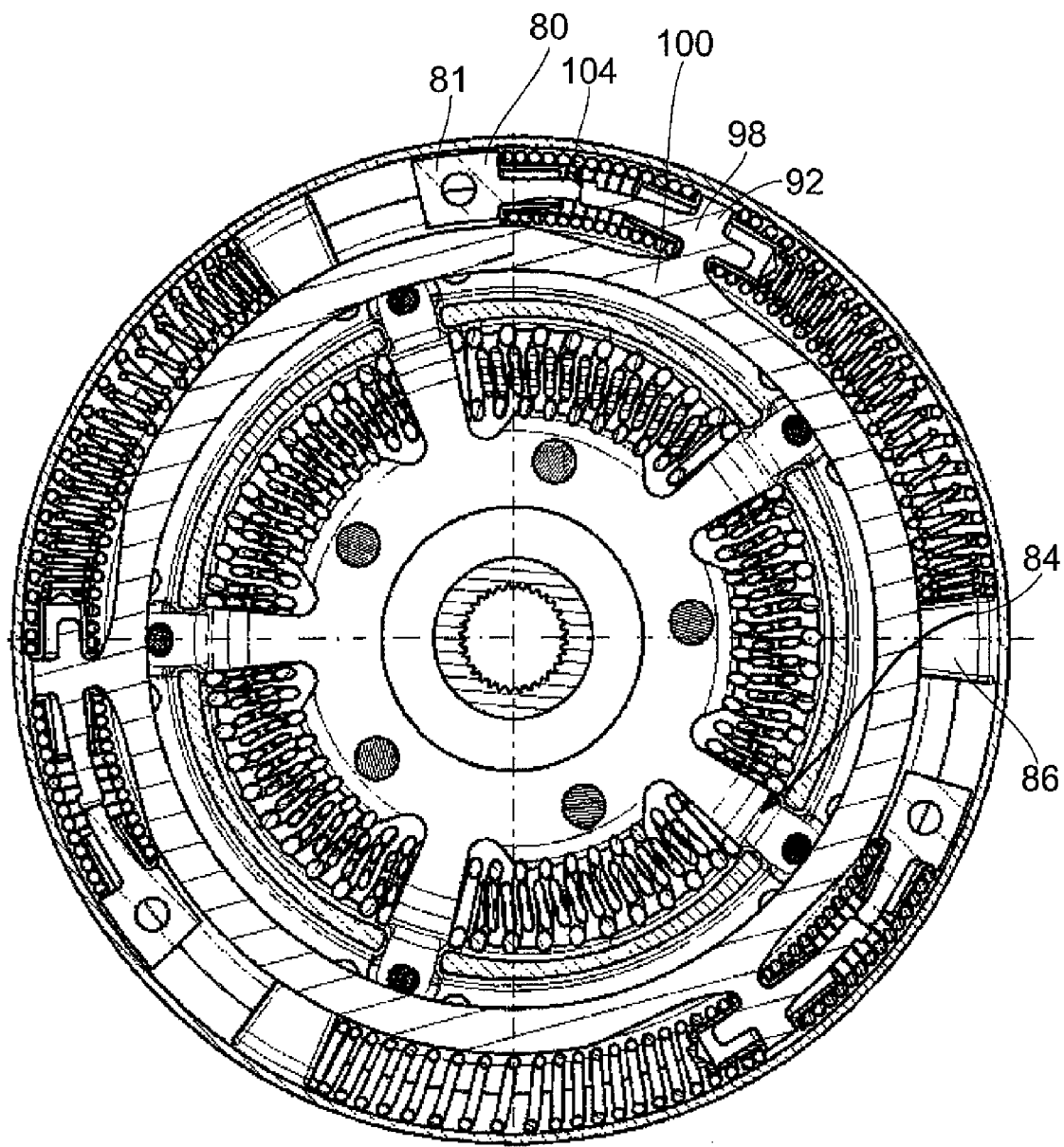
FIG. 4 is a view similar to that shown in FIG. 3, with a loaded damper unit.

Referring again to one of the spring assemblies 74 of the radially outer damper unit 52, this spring assembly 74 has, at its drive-side control element 81 facing in clockwise direction with reference to FIG. 3 or 4, a circumferential shoulder 88 which is enclosed by a spring cup 106. The radial supporting unit 98 is formed with circumferential extensions 100 on both sides in circumferential direction, each circumferential extension 100 supporting a spring cup 106. These spring cups 106, each of which is constructed as a hollow body, enclose the circumferential shoulder 88 or the circumferential extensions 100 in such a way that the spring cup 106 is supported radially at the circumferential shoulder 88 or at the circumferential extensions 100 by its inner wall 107 under the influence of centrifugal force. Coming into contact with the inner diameter of turns 124, 126 of the spring units 76 or 77, the outer wall 108 of the respective spring cup 106 reaches into the respective spring unit 76 or 77 with a circumferential projection 111 by a depth of more than one turn 124 or 126. Also shown is a stop 90.

In the drawing, the respective spring cup 106 penetrates with its circumferential projection 111 into the respective spring unit 76, 77 to a depth of preferably at least three turns 124, 126. Further, each spring cup 106 has, at its sides facing the drive-side control elements 81 or radial supporting units 98, an angle 109 by which it enters in circumferential direction between the drive-side control element 81 and the adjacent end-side turns 124 of the first spring unit 76, between the radial supporting unit 98 and the adjacent end-side turns 124 of the first spring unit 76, or between the radial supporting unit 98 and the adjacent end-side turns 126 of the second spring unit 77.

The spring cups 106 are open at their free ends, opening 110, in association with the first spring units 76, namely, so that the circumferential shoulder 88 of the drive-side control element 81 can reach through on the one hand and so that the circumferential extension 100 of the radial supporting unit 98 can reach through on the other hand. In contrast, the spring cup 106 is closed at its free end in association with the second spring unit 77 so as to act upon the second spring 79 arranged inside spring 78.

The circumferential shoulder 88 of the drive-side control element 81 and the circumferential extension 100 of the radial supporting unit 98 act in association with the first spring unit 76 as a first rotational angle limiting means 104 which is explained in the following.

FIG. 3 shows the torsional vibration damper arrangement 10 in its initial position in which no torque is conducted via the damping arrangement 54. When torque is introduced by the lockup clutch 9, as is shown in FIG. 4, the drive-side control element 81 is deflected in clockwise direction and the spring units 76, 77 of the spring assembly 74 are accordingly compressed. Since the first spring unit 76 is designed for lower torques than the second spring unit 77, the first spring unit 76 is compressed to a greater degree as the applied torque increases. This process continues until, as shown in FIG. 4, the circumferential shoulder 88 of the drive-side control element 81 comes into contact with the circumferential extension 100 of the radial supporting unit 98 and further compression of the first spring unit 76 is accordingly prevented. The circumferential shoulder 88 of the drive-side control element 81 and the circumferential extension 100 of the radial supporting unit 98 are designed in such a way that they prevent contact of the individual turns 124 of the first spring unit 76.

The spring assembly 74 has a second rotational angle limiting device 130 acting between the radially outer hub disk 46 and the two cover plates 58, 59. The second rotational angle limiting device 130 is formed by riveting 94, which connects the two cover plates 58, 59 and which is received in a circumferential recess of the radially outer hub disk 46 and is operative as soon as the rivet 94 has reached the circumference-side end of this circumferential recess. The second rotational angle limiting means 130 prevents the turns 126, 127 of the springs 78, 79 of the second spring unit 77 from contacting one another.

A rotational angle limiting device 132 is also associated with the radially inner damper unit 56 so that turns 116, 128, 129 of springs 119, 121 of the spring units 118 do not come into contact with each other. To this end, a rivet 134 serving as a spacer between the two cover plates 58, 59 is provided radially inside the radially inner damper unit 56 and, fastened to these cover plates 58, 59, engages in circumferential recesses, not shown, of the radially inner hub disk 62. As soon as the rivet 134 reaches the circumference-side end of a circumferential recess of this kind, further relative deflection between the cover plates 58, 59 and the radially inner hub disk 62 is prevented. This forms the third rotational angle limiting means 132 of the torsional vibration damper arrangement 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torsional vibration damper arrangement comprising:
a damping arrangement;
a driving transmission device having a first circumferential supporting area;
a driven transmission device having a second circumferential supporting area and rotatable around an axis of rotation counter to the action of the damping arrangement with respect to the driving transmission device,
wherein the damping arrangement is arranged in the first and second circumferential supporting area supported thereon by circumferential ends and comprises:
at least one damper unit comprising a plurality of spring units arranged successively in circumferential direction; and
a radial supporting arrangement configured to radially support the damper unit in an intermediate supporting area between the circumferential ends comprising at least one annular radial supporting member with a plurality of radial supporting units, at least one of which is configured to receive a respective spring cup to form an operative connection with a respective associated intermediate supporting area of the damper unit by the spring cup that penetrates into the associated spring unit and is enclosed by the respective intermediate supporting area of the associated spring unit, wherein
the at least one annular radial supporting member is rotatable around the axis of rotation with respect to the driving transmission device and the driven transmission device,
the radial supporting units have circumferential extensions, and the spring cups are constructed as hollow bodies which surround the respective circumferential extensions to be supported at least radially; and
the circumferential extensions are provided which cooperate with a stop of the associated circumferential supporting area as a rotational angle limiting means between the radial supporting arrangement and the circumferential supporting area, wherein the circumferential extensions that cooperate with the stop of the corresponding circumferential supporting area extend in the circumferential direction to face the stop and project beyond the respective spring cup enclosing it wherein the stop of the circumferential supporting area is formed by a circumferential shoulder oriented to the radial supporting unit adjacent to it in circumferential direction wherein the circumferential supporting area having the stop has a related spring cup, and the circumferential shoulder acting as stop projects beyond the related spring cup in circumferential direction.

2. A torsional vibration damper arrangement comprising:
a damping arrangement;
a driving transmission device having a first circumferential supporting area;
a driven transmission device having a second circumferential supporting area and rotatable around an axis of rotation counter to the action of the damping arrangement with respect to the driving transmission device,
wherein the damping arrangement is arranged in the first and second circumferential supporting area supported thereon by circumferential ends and comprises:
at least one damper unit comprising a plurality of spring units arranged successively in circumferential direction; and
a radial supporting arrangement configured to radially support the damper unit in an intermediate supporting area between the circumferential ends comprising at least one annular radial supporting member with a plurality of radial supporting units, at least one of which is configured to receive a respective spring cup to form an operative connection with a respective associated intermediate supporting areas area of the damper unit by the spring cup that penetrates into the associated spring unit and is enclosed by the respective intermediate supporting area of the associated spring unit, wherein
the at least one annular radial supporting member is rotatable around the axis of rotation with respect to the driving transmission device and the driven transmission device,
the radial supporting units have circumferential extensions, and the spring cups are constructed as hollow bodies which surround the respective circumferential extensions to be supported at least radially; and
the circumferential extensions are provided which cooperate with a stop of the associated circumferential supporting area as a rotational angle limiting means between the radial supporting arrangement and the circumferential supporting area, wherein the circumferential extensions that cooperate with the stop of the corresponding circumferential supporting area extend in the circumferential direction to face the stop and project beyond the respective spring cup enclosing it wherein the stop of the circumferential supporting area is formed by a circumferential shoulder oriented to the radial supporting unit adjacent to it in circumferential direction wherein the circumferential extension of at least one of the radial supporting arrangements and the circumferential shoulder of the circumferential supporting area are dimensioned in the circumferential direction such that, when touching, the turns of the spring unit located between the radial supporting arrangement and the circumferential supporting area do not come into contact with one another.

3. The torsional vibration damper arrangement according to claim 2, wherein the spring cups extend beyond the respective first circumference-side turn of a respective spring unit to project into the spring unit.

4. A torsional vibration damper arrangement comprising:
a damping arrangement;
a driving transmission device having a first circumferential supporting area;
a driven transmission device having a second circumferential supporting area and rotatable around an axis of rotation counter to the action of the damping arrangement with respect to the driving transmission device,
wherein the damping arrangement is arranged in the first and second circumferential supporting area supported thereon by circumferential ends and comprises:

at least one damper unit comprising a plurality of spring units arranged successively in circumferential direction; and a radial supporting arrangement configured to radially support the damper unit in an intermediate supporting area between the circumferential ends comprising at least one annular radial supporting member with a plurality of radial supporting units, at least one of which is configured to receive a respective spring cup to form an operative connection with a respective associated intermediate supporting areas area of the damper unit by the spring cup that penetrates into the associated spring unit and is enclosed by the respective intermediate supporting area of this the associated spring unit, wherein the at least one annular radial supporting member is rotatable around the axis of rotation with respect to the driving transmission device and the driven transmission device, the radial supporting units have circumferential extensions, and the spring cups are constructed as hollow bodies which surround the respective circumferential extensions to be supported at least radially; and the circumferential extensions are provided which cooperate with a stop of the associated circumferential supporting area as a rotational angle limiting means between the radial supporting arrangement and the circumferential supporting area wherein an extension width of a first spring unit located between the radial supporting arrangement and one of the first and second circumferential supporting areas is substantially smaller in the circumferential direction than at least one other spring unit located between the radial supporting arrangement and the other of the first and second circumferential supporting areas.

5. The torsional vibration damper arrangement according to claim 4, wherein the first spring unit is designed for lower torques than the at least one other spring unit.

6. The torsional vibration damper arrangement according to claim 5, wherein the at least one other spring unit has a respective rotational angle limiting means.

\* \* \* \* \*